United States Patent
Ko

(10) Patent No.: US 7,027,781 B2
(45) Date of Patent: Apr. 11, 2006

(54) REMOTE CONTROL SYSTEM FOR ELECTRICAL APPARATUS

(76) Inventor: Siu Ling Ko, Rm. 819 Peninsula Centre, 67 Mody Road, Tsimshatsui East, Kowloon (HK)

( * ) Notice: Subject to any disclaimer, the term of this patent is extended or adjusted under 35 U.S.C. 154(b) by 518 days.

(21) Appl. No.: 10/108,829

(22) Filed: Mar. 27, 2002

(65) Prior Publication Data

US 2003/0186690 A1    Oct. 2, 2003

(51) Int. Cl.
*H04B 1/02* (2006.01)
*H04B 1/00* (2006.01)

(52) U.S. Cl. .................... 455/92; 455/128; 455/575.1

(58) Field of Classification Search ............... 455/352, 455/92, 90.2, 90.3, 701, 702, 267, 564, 575; 379/433.01, 357.03, 357.04, 420.02
See application file for complete search history.

(56) References Cited

U.S. PATENT DOCUMENTS

| | | | |
|---|---|---|---|
| 4,392,022 A * | 7/1983 | Carlson | 348/552 |
| 5,138,649 A * | 8/1992 | Krisbergh et al. | 455/420 |
| 5,251,329 A * | 10/1993 | Takagi et al. | 455/572 |
| 5,633,917 A * | 5/1997 | Rogers | 379/74 |
| 5,706,332 A * | 1/1998 | Nagai | 455/575.3 |
| 5,802,460 A * | 9/1998 | Parvulescu et al. | 455/92 |
| 5,881,149 A * | 3/1999 | Weatherill | 379/433.02 |
| 6,058,184 A * | 5/2000 | Frank | 379/420.02 |
| 6,223,029 B1 * | 4/2001 | Stenman et al. | 455/420 |
| 6,233,469 B1 * | 5/2001 | Watanabe | 455/575.1 |
| 6,445,933 B1 * | 9/2002 | Pettit | 455/556.1 |
| 2002/0098835 A1 * | 7/2002 | Flick | 455/420 |
| 2002/0137475 A1 * | 9/2002 | Shou et al. | 455/90 |

FOREIGN PATENT DOCUMENTS

| | | |
|---|---|---|
| DE | 34 16 830 A1 | 11/1985 |
| DE | 199 18 356 A1 | 10/2000 |
| EP | 0 913 979 A2 | 5/1999 |
| WO | WO-94/01963 A1 | 1/1994 |

* cited by examiner

*Primary Examiner*—William Trost
*Assistant Examiner*—Kiet Doan
(74) *Attorney, Agent, or Firm*—Darby & Darby

(57) ABSTRACT

A remote control system for controlling the operation of electrical apparatus, comprising a receiver provided in use at said apparatus and a transmitter having a casing and adapted for use as an add-on module in conjunction with a telephone capable of dialling based on DTMF (Dual-Tone-Multi-Frequency). The transmitter comprises an input device for receiving a DTMF dialling signal from said telephone, and a transmitter circuit housed in the casing for subsequently processing the signal and then transmitting it as a remote control signal for receipt by the receiver. The receiver comprises a receiver circuit for receiving the remote control signal transmitted by the transmitter, and a control circuit for subsequently processing the control signal and then controlling the operation of said apparatus according to the control signal.

11 Claims, 4 Drawing Sheets

REMOTE CONTROL SYSTEM FOR ELECTRICAL APPARATUS

The present invention relates to a remote control system for controlling the operation of electrical apparatus such as a toy or an appliance.

BACKGROUND OF THE INVENTION

A typical remote control system for controlling the operation of electrical apparatus has two parts. The first part is a receiver provided at the apparatus under control, and the second part is a transmitter for generating and transmitting a control signal for receipt by the receiver to control the apparatus. The transmitter invariably includes keys, buttons and/or switches for operation, which increase the production cost of the overall transmitter and their design cannot be changed.

The invention seeks to mitigate or at least alleviate such shortcomings by providing an improved remote control system.

SUMMARY OF THE INVENTION

According to the invention, there is provided a remote control system for controlling the operation of electrical apparatus, comprising a receiver provided in use at said apparatus and a transmitter having a casing and adapted for use as an add-on module in conjunction with a telephone capable of dialling based on DTMF (Dual-Tone-Multi-Frequency). The transmitter comprises an input device for receiving a DTMF dialling signal from said telephone, and a transmitter circuit housed in the casing for subsequently processing the signal and then transmitting it as a remote control signal for receipt by the receiver. The receiver comprises a receiver circuit for receiving the remote control signal transmitted by the transmitter, and a control circuit for subsequently processing the control signal and then controlling the operation of said apparatus according to the control signal.

It is preferred that the remote control system further comprises a decoder which is provided at one of the transmitter and receiver for decoding the relevant signal from an analogue DTMF format into a specific digital format compatible with the control circuit.

In a first preferred embodiment, the decoder forms a part of the transmitter and is connected between the input device and the transmitter circuit for decoding the signal received by the input device into a corresponding control signal in digital format for subsequent processing and transmission by the transmitter circuit.

In a second preferred embodiment, the decoder forms a part of the receiver and is connected between the receiver circuit and the control circuit for decoding the signal received by the receiver circuit into a corresponding control signal in digital format for subsequent processing and use by the control circuit to control the operation of said apparatus.

Preferably, the input device comprises a microphone for acoustically receiving a DTMF dialling signal from a speaker of said telephone.

More preferably, the casing also houses the microphone and includes means for releasably attaching the casing onto a speaker region of said telephone.

Alternatively, it is preferred that the input device comprises an electrical connector that is connected to the casing and is insertable into a hands-free port of said telephone for electrically receiving a DTMF dialling signal from said telephone.

It is preferred that the transmitter and receiver comprise infrared transmitter and receiver respectively.

It is preferred that, alternatively, the transmitter and receiver comprise radio-frequency transmitter and receiver respectively.

It is an advantage that the transmitter does not have any keys, buttons or switches for controlling the operation of the receiver.

Preferably, the input device is also capable of receiving a melody ringing signal from said telephone for said subsequent processing and then transmission by the transmitter circuit.

More preferably, the remote control system further comprises a decoder which is provided at one of the transmitter and receiver for decoding the relevant signal from an analogue melody format into a specific digital format compatible with the control circuit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT(S)

The basic concept of the subject invention resides in the use of a telephone, such as a mobile phone in particular or a ground telephone, that is capable of dialling based on DTMF (Dual-Tone-Multi-Frequency), for the remote control of electrical and/or electronic apparatus. Examples of the apparatus that can be controlled are unlimited, including toys such as cars and robots etc, and appliances such as air-conditioners, televisions and lights, etc.

Most modern mobile phones and ground telephones are equipped with a standard DTMF tone dialler, and some of them also include a melody generator for ringing tones, both of which can be operated in either off-line or on-line mode. The dialling and melody sounds are output either by means of the built-in speaker or via the hands-free port of a mobile phone, for example. The invention makes use of the DTMF tones and/or melodies from a tone-dialling telephone, in conjunction with appropriate electronic operating circuits, to generate a remote control signal.

DTMF (Dual-Tone-Multi-Frequency) is a standard telephone coding scheme for the transmission of dialling digit signals to the telephone exchange. According to the scheme, two audio tones are used to represent each key on the telephone keypad, as shown in the table below. Upon the depression of a specific key, the tone (or frequency) of the associated column and the tone of the associated row as shown in the table are generated. For example, pressing of the key "5" will generate the dual tones of 770 Hz and 1336 Hz.

| 1 | 2 | 3 | A | 697 Hz |
|---|---|---|---|--------|
| 4 | 5 | 6 | B | 770 Hz |
| 7 | 8 | 9 | C | 852 Hz |
| * | 0 | # | D | 941 Hz |
| 1209 Hz | 1336 Hz | 1477 Hz | 1633 Hz | |

The DTMF tones are usually generated locally by pressing the keypad of the telephone in hand, but they can also be received during a call connection from the remote telephone having DTMF features.

Melody sounds are also available in most modern telephones as an alternative to the normal ringing tones, which can be programmed within the telephones or downloaded from a personal computer or the Internet and can be activated at will using the telephone menu.

Figure 1:
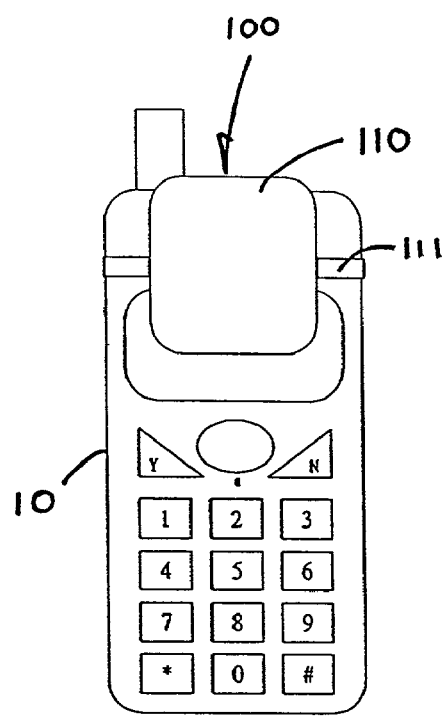
FIG. 1 is a front view of a transmitter of an embodiment of a remote control system in accordance with the invention, said transmitter being attached onto a speaker region of a tone-dialling telephone.
Figure 2:
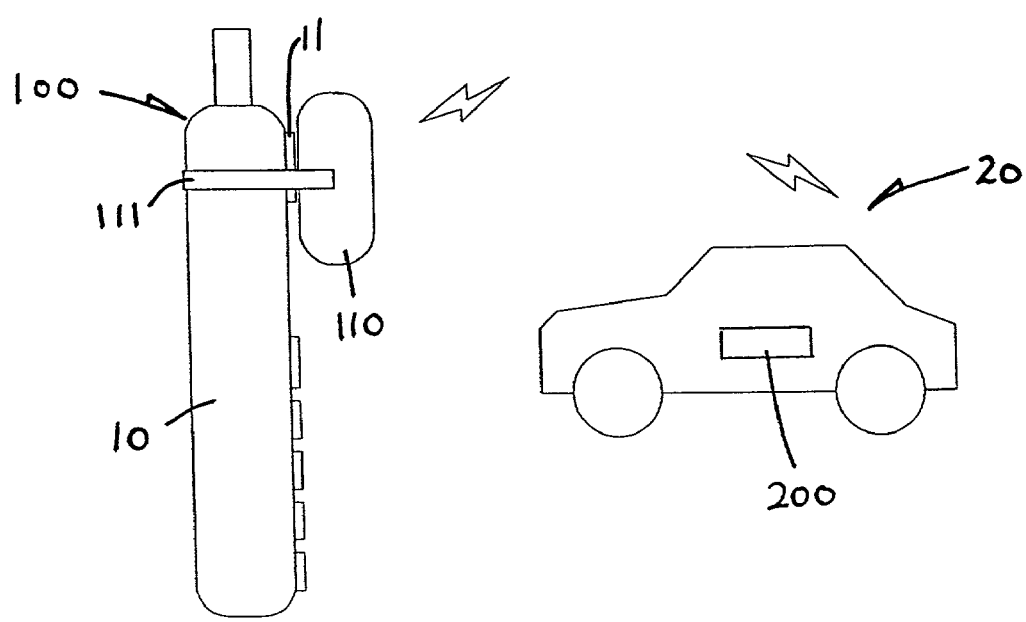
FIG. 2 is a side view of the transmitter and telephone of FIG. 1, controlling the operation of a toy car provided with a receiver of the remote control system.
Figure 3:
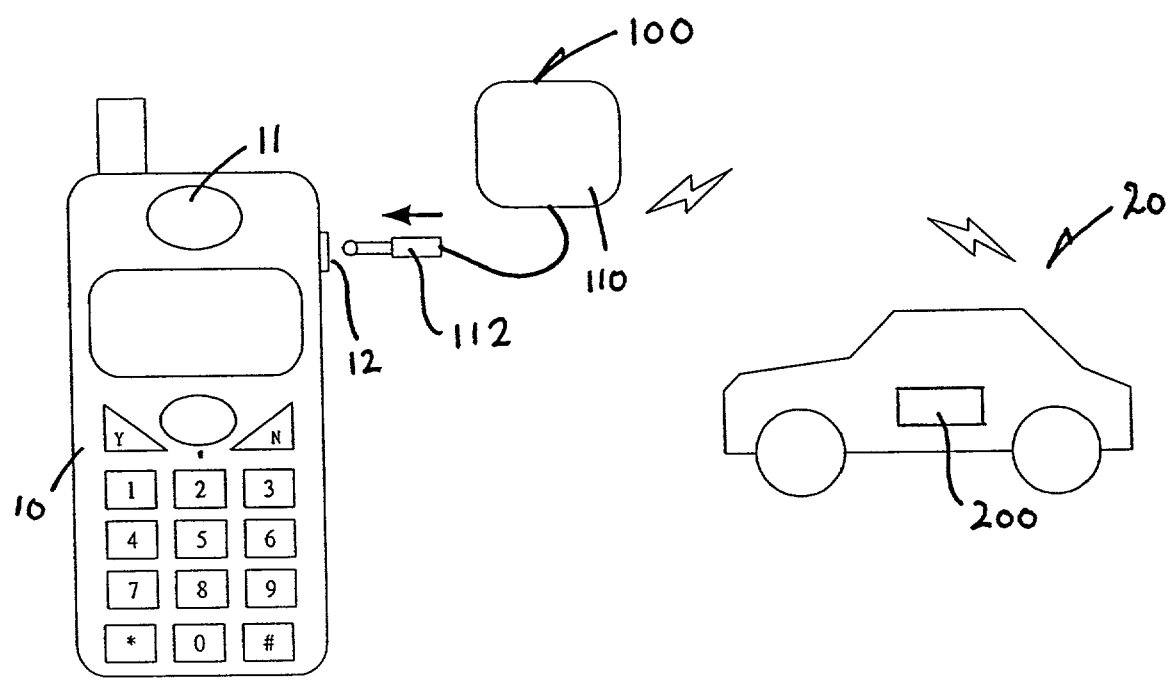
FIG. 3 is a front view of the transmitter and telephone of FIG. 2, controlling the operation of the toy car, with the transmitter being connected to a hands-free port of the telephone as an alternative arrangement.

Referring initially to FIGS. 1 to 3 of the drawings, there is shown a remote control system embodying the invention, which system comprises a transmitter 100 for use in conjunction with a tone-dialling telephone such as a mobile phone 10, and includes an associated receiver 200 provided at electrical (and/or electronic) apparatus such as a toy car 20. The transmitter 100 is adapted for use as an add-on module to the mobile phone 10. The receiver 200 is preferably, but not necessarily, a built-in component within the toy car 20.

The transmitter 100 is a self-contained miniaturised device having a relatively small casing 110 that is in use releasably attached or tied by means of a rubber band 111 onto a speaker region 11 of the mobile phone 10, for use as an add-on module. This arrangement establishes an acoustic coupling between the transmitter 100 and the mobile phone 10, thereby enabling the transmitter 100 to pick up the DTMF dialling tones (or melody ringing tones) from the mobile phone 10 via its speaker 11.

As an alternative to being attached onto the mobile phone 10 for use, the transmitter 100 includes an electrical connector in the form of a plug or jack 112 that is insertable into a hands-free port 12 of the mobile phone 10, likewise for use as an add-on module. This arrangement establishes an electrical connection between the transmitter 100 and the mobile phone 10 such that the transmitter 100 can directly receive the DTMF dialling tones (or melody ringing tones) from the mobile phone 10 via its hands-free port 12. The jack 112 may incorporate an auto-power switch that will only turn on battery power (123) to the transmitter 100 when it is plugged into the hands-free port 12.

Figures 4, 5:
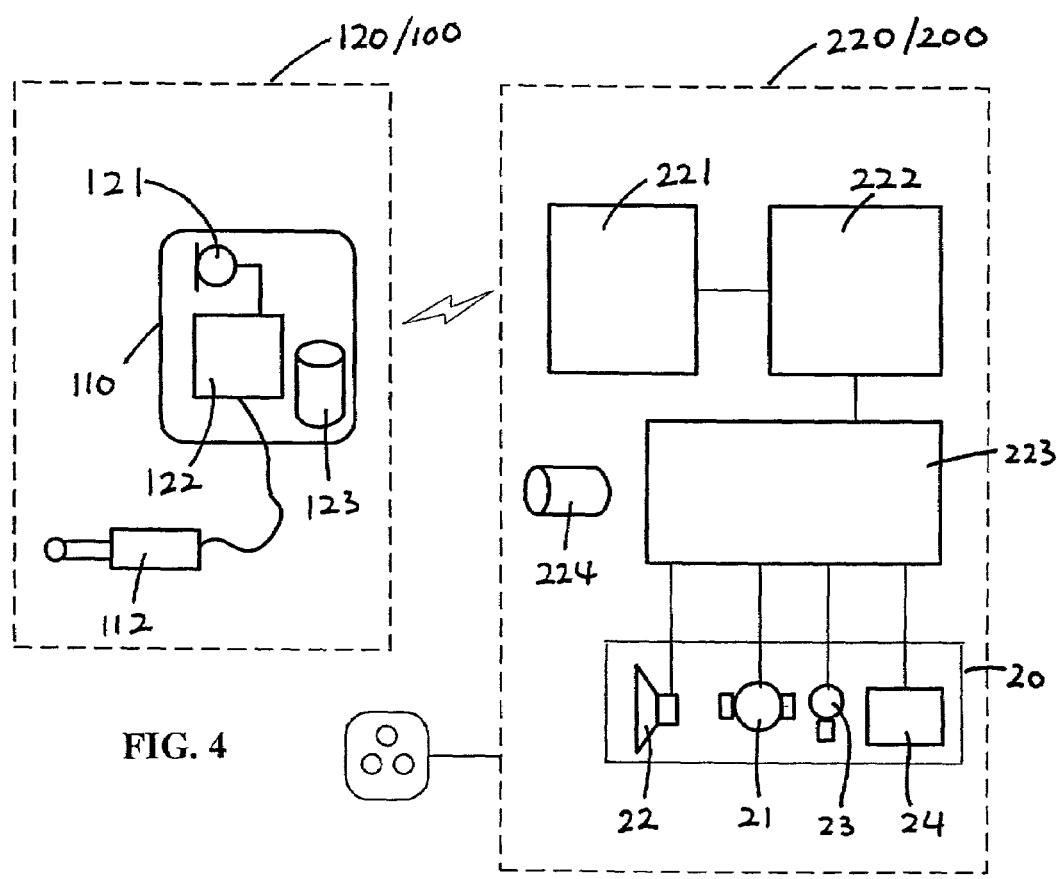
FIG. 4 is a functional block diagram of an electronic operating circuitry of the transmitter of FIG. 1.
FIG. 5 is a functional block diagram of an electronic operating circuitry of the receiver of FIG. 2, associated with the transmitter operating circuitry of FIG. 4.

FIG. 4 shows an electronic operating circuitry 120 of the transmitter 100, which comprises a microphone 121 connected to a transmitter circuit 122 that is in turn powered by a battery 123, all being housed within the casing 110. The jack 112 forms a part of the operating circuitry 120 and is connected externally to the casing 110. The microphone 121 is located to face outwards from directly behind a rear wall of the casing 110, and this casing wall may be perforated to facilitate the microphone 121 to pick up sound.

The jack 112 and microphone 121 are for alternative uses as an input device for receiving the DTMF dialling signal (or melody ringing signal) from the mobile phone 10, depending on whether the transmitter 100 is mounted on (FIG. 1) or connected to (FIG. 3) the mobile phone 10.

The transmitter circuit 122 is an analogue infrared (IR) or radio-frequency (RF) transmitter, whose construction and operation insofar as signal transmission is concerned are generally known in the art. The transmitter circuit 122 serves to process the signal received by the input device 112/121 and then to transmit it as an IR/RF remote control signal for receipt by the receiver 200.

FIG. 5 shows an electronic operating circuitry 220 of the receiver 200, which comprises a receiver circuit 221, a decoder 222 connected to the receiver circuit 221, a control circuit 223 connected to the decoder 222, and a battery 224 for power. The receiver circuit 221 is a corresponding analogue IR or RF receiver, whose construction and operation insofar as signal reception is concerned are generally known in the art. The receiver circuit 221 serves to receive the IR/RF remote control signal transmitted by the transmitter 100. At this stage, the DTMF/melody remote control signal remains in an analogue format.

The decoder 222 is provided as an integral part in the receiver 200 for decoding and converting the DTMF/melody signal received by the receiver circuit 221 into a control signal of a digital format that is compatible with the control circuit 223 for subsequent processing and use by the latter to control the operation of the toy car 20. As an example, the DTMF tones representing digit "5" are converted into to a digital control signal equivalent to binary number "0101". In the case of a melody tone, melody note "Do" is converted into a digital control signal equivalent to binary number "0111". It is noted that the decoder 222 can be a piece of separate hardware device or an integral part of the control circuit 223.

The control circuit 223 is a microprocessor-based integrated circuit that is programmed to perform various functions, in essence for processing the digital control signal provided by the decoder 222 and then controlling the operation of the toy car 20 according to the control signal. As an example, a digital control signal corresponding to the DTMF tones for digit "5" controls the toy car 20 to move straight forwards, and that corresponding to melody note "Do" controls the toy car 20 to turn left or right.

It is envisaged that the subject remote control system may control any other or a number of electrical and/or electronic apparatus, subject to suitable modifications to the control circuit 223. Examples include moving a robot and switching on/off an air-conditioner, television or light. In FIG. 5, motor 21 may represent the motor of the toy car 20 or that of a robot, or the compressor of an air-conditioner. Speaker 22 may represent an audio amplifier, with light bulb 23 representing a light and icon 24 a television. Through multiple use of the digits on the keypad of the mobile phone 10, more sophisticated control may be performed, for example to adjust the thermostat of an air-conditioner or select the channels of a television, etc, after they have been switched on.

Figures 6, 7:
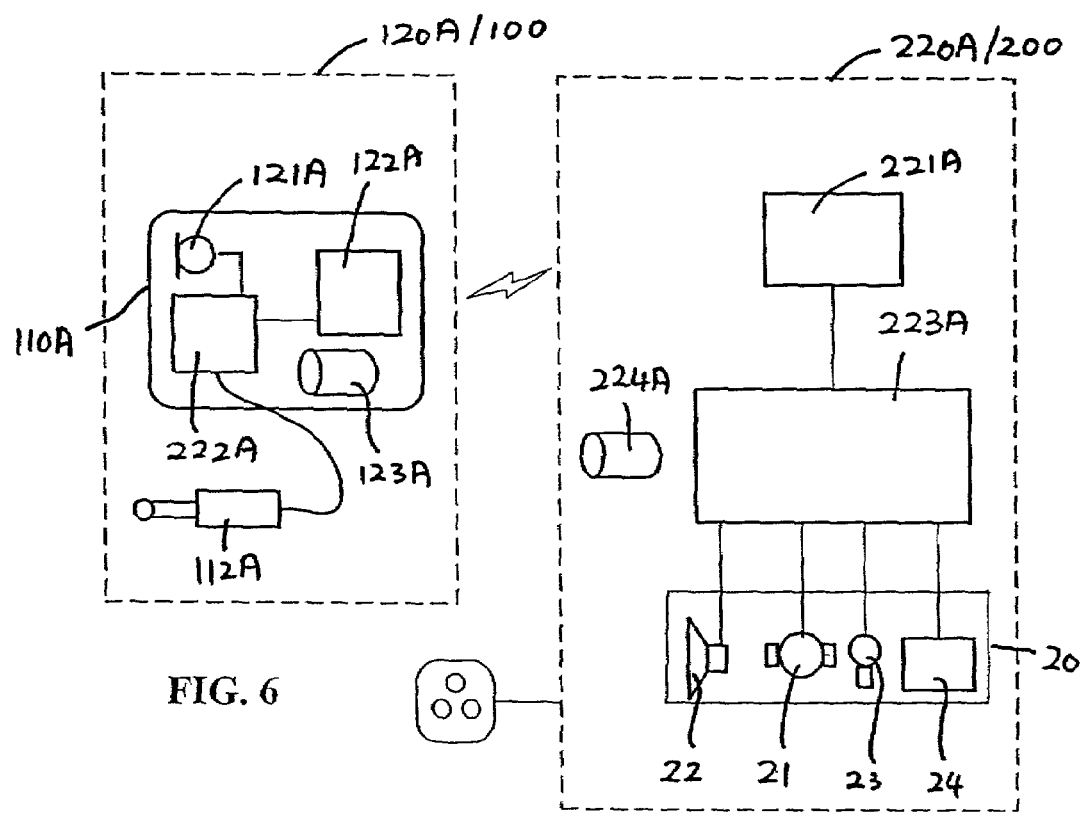
FIG. 6 is a functional block diagram of a modified electronic operating circuitry of the transmitter of FIG. 1.
FIG. 7 is a functional block diagram of an electronic operating circuitry of the receiver of FIG. 2, associated with the transmitter operating circuitry of FIG. 6.

Reference is finally made to FIGS. 6 and 7, showing different electronic operating circuitries 120A and 220A for the transmitter 100 and receiver 200 respectively. The operating circuitries 120A and 220A have only been modified slightly from the previous counterparts 120 and 220, with equivalent parts designated by the same reference numerals suffixed by a letter "A". The only major difference in construction lies in the decoder 222A being now included in the transmitter 100, rather than in the receiver 200 as in the case of the previous circuitries 120 and 220. Insofar as operation is concerned, there are no material differences.

As an integral part of the transmitter operating circuitry 120A, the decoder 222A decodes and converts the DTMF/melody signal received by the microphone 121A or jack 112A into a digital format before the signal is transmitted by the IR/RF transmitter circuit 122A to the IR/RF receiver circuit 221A.

Given that the signal for transmission is now a digital signal, it is relatively much less susceptible to transmission error that may be caused by noise and interference, as opposed to the analogue transmission between the aforesaid transmitter and receiver circuits 122 and 221. As another advantage, security features can be added since the transmitting signal is digitally coded. The remote control signal as received by the receiver circuit 221A is already in a digital format that is compatible with the control circuit 223A for subsequent processing and use by the latter to control the operation of the apparatus or appliances 20 to 24.

It is important to note that the transmitter 100 does not have any keys, buttons or switches for its main functions i.e. controlling the operation of the receiver 200.

The subject remote control system 100/200 has an operation that does not affect the normal usage of the mobile phone 10, as no modifications are needed for the telephone 10 itself. The transmitter 100 is designed for use as an add-on module to a tone-dialling telephone. In addition, the invention enables a remote controller to be made using almost any tone-dialling telephone that is commonplace, by simply attaching or connecting the small and self-contained transmitter 100 to the telephone and making use of the telephone keypad.

The invention has been given by way of example only, and various other modifications of and/or alterations to the described embodiment may be made by persons skilled in the art without departing from the scope of the invention as specified in the appended claims.

What is claimed is:

1. A remote control system for controlling the operation of electrical apparatus, comprising a receiver provided in use at said apparatus and a transmitter adapted for use as an add-on module in conjunction with a telephone housed within a first casing capable of dialling based on DTMF (Dual-Tone-Multi-Frequency), a second casing housing said transmitter wherein the transmitter comprises an input device extending through said second casing and connecting said transmitter with the telephone for receiving a DTMF dialling signal from said telephone, and a transmitter circuit housed in the second casing for subsequently processing the signal and then transmitting it as a remote control signal for receipt by the receiver, and the receiver comprises a receiver circuit for receiving the remote control signal transmitted by the transmitter, and a control circuit for subsequently processing the control signal and then controlling the operation of said apparatus according to the control signal.

2. The remote control system as claimed in claim 1, further comprising a decoder which is provided at one of the transmitter and receiver for decoding the relevant signal from an analogue DTMF format into a specific digital format compatible with the control circuit.

3. The remote control system as claimed in claim 2, wherein the decoder forms a part of the transmitter and is connected between the input device and the transmitter circuit for decoding the signal received by the input device into a corresponding control signal in digital format for subsequent processing and transmission by the transmitter circuit.

4. The remote control system as claimed in claim 2, wherein the decoder forms a part of the receiver and is connected between the receiver circuit and the control circuit for decoding the signal received by the receiver circuit into a corresponding control signal in digital format for subsequent processing and use by the control circuit to control the operation of said apparatus.

5. The remote control system as claimed in claim 1, wherein the input device comprises a microphone for acoustically receiving a DTMF dialling signal from a speaker of said telephone.

6. The remote control system as claimed in claim 5, wherein the second casing also houses the microphone and includes means for releasably attaching the second casing onto a speaker region of said telephone.

7. The remote control system as claimed in claim 1, wherein the transmitter and receiver comprise infrared transmitter and receiver respectively.

8. The remote control system as claimed in claim 1, wherein the transmitter and receiver comprise radio-frequency transmitter and receiver respectively.

9. The remote control system as claimed in claim 1, wherein the transmitter does not have any keys, buttons or switches for controlling the operation of the receiver.

10. The remote control system as claimed in claim 1, wherein the input device is also capable of receiving a melody ringing signal from said telephone for said subsequent processing and then transmission by the transmitter circuit.

11. The remote control system as claimed in claim 10, further comprising a decoder which is provided at one of the transmitter and receiver for decoding the relevant signal from an analogue melody format into a specific digital format compatible with the control circuit.

* * * * *